United States Patent
Dobbin

(10) Patent No.: US 10,968,944 B2
(45) Date of Patent: Apr. 6, 2021

(54) CAP FOR A FASTENER

(71) Applicant: Airbus Operations Limited, Bristol (GB)

(72) Inventor: Richard Dobbin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 661 days.

(21) Appl. No.: 15/847,244

(22) Filed: Dec. 19, 2017

(65) Prior Publication Data

US 2018/0172056 A1 Jun. 21, 2018

(30) Foreign Application Priority Data

Dec. 20, 2016 (GB) ..................................... 1621730

(51) Int. Cl.
| | | |
|---|---|---|
| *F16B 37/14* | (2006.01) | |
| *F16B 33/00* | (2006.01) | |
| *F16B 11/00* | (2006.01) | |
| *B64D 45/02* | (2006.01) | |
| *B64D 37/00* | (2006.01) | |

(52) U.S. Cl.
CPC .............. *F16B 37/14* (2013.01); *B64D 45/02* (2013.01); *F16B 11/006* (2013.01); *F16B 33/004* (2013.01); *B64D 37/005* (2013.01)

(58) Field of Classification Search
CPC ................................ F16B 37/14; B64D 47/00
USPC ................................................ 411/372.6, 373
See application file for complete search history.

(56) References Cited

U.S. PATENT DOCUMENTS

| | | | | | |
|---|---|---|---|---|---|
| 4,293,243 | A | * | 10/1981 | Graybeal | A47G 3/00 405/259.1 |
| 4,295,766 | A | * | 10/1981 | Shaw | F16B 37/14 411/113 |
| 4,948,319 | A | * | 8/1990 | Day | F16B 1/0071 411/377 |
| 5,419,666 | A | * | 5/1995 | Best | E04D 3/38 411/373 |
| 6,086,972 | A | * | 7/2000 | Rayburn | B25B 23/00 411/373 |
| 7,384,225 | B2 | * | 6/2008 | Woolstencroft | F16B 37/14 411/372.6 |
| 8,308,115 | B2 | * | 11/2012 | Goto | B60N 3/083 248/205.1 |
| 8,366,367 | B2 | * | 2/2013 | Matlock | F16B 37/14 411/429 |
| 8,894,338 | B2 | * | 11/2014 | Dobbin | F16B 39/225 411/373 |

(Continued)

FOREIGN PATENT DOCUMENTS

| | | |
|---|---|---|
| EP | 0 506 414 | 9/1992 |
| WO | WO 2015/025130 | 2/2015 |

OTHER PUBLICATIONS

European Search Report EP 17206571.6-1010 dated May 7, 2018, 8 pages.

(Continued)

*Primary Examiner* — Gary W Estremsky
(74) *Attorney, Agent, or Firm* — Nixon & Vanderhye P.C.

(57) ABSTRACT

A cap configured for providing a sealed cavity around an end of a fastener and a method of bonding a cap to a structural member in which a contact adhesive is provided for fixing the cap to the structural member and a curable sealant is provided for bonding the cap to the substrate.

9 Claims, 4 Drawing Sheets

(56) References Cited

U.S. PATENT DOCUMENTS

| | | | | |
|---|---|---|---|---|
| 9,011,062 B2* | 4/2015 | Chirol | ............ | F16B 33/02 |
| | | | | 411/372.5 |
| 2016/0159493 A1* | 6/2016 | Dobbin | ............ | F16B 33/004 |
| | | | | 411/82.1 |
| 2016/0244181 A1* | 8/2016 | Dobbin | ............ | F16B 37/14 |
| 2017/0108029 A1* | 4/2017 | Song | ............ | F16B 37/14 |

OTHER PUBLICATIONS

Combined Search and Examination Report for GB1621730.9, dated Apr. 12, 2017, 5 pages.

* cited by examiner

CAP FOR A FASTENER

RELATED APPLICATION

This application claims priority to United Kingdom (GB) patent application 1621730.9, filed Dec. 20, 2016, the entire contents of which is incorporated by reference.

FIELD OF TECHNOLOGY

The present technology relates to a cap for forming a sealed cavity around an end of a fastener protruding from a structure. The technology further relates to cap for forming a sealed cavity around an end of a fastener protruding from an aircraft structural member and to methods of fitting a cap for forming a sealed cavity around an end of a fastener protruding from an aircraft structural member.

BACKGROUND

A known cap for forming a sealed cavity around an end of a fastener protruding from a structure is described in WO2015025130. The cap has a cap body with an annular base terminating at a rim which surrounds an opening into a central cavity; an annular skirt providing an annular pocket between the skirt and the base; and an inlet hole in the skirt. The inlet hole is in fluid communication with the pocket and arranged to interconnect with a sealing material injection device to provide a flow of sealing material through the skirt via the inlet hole into the pocket. An outlet is also provided in the skirt. The outlet is in fluid communication with the pocket and arranged to enable air to escape the pocket through the skirt via the outlet hole as the sealing material flows from the inlet hole into the pocket.

BRIEF SUMMARY OF THE TECHNOLOGY

Embodiments of the present technology provide a cap for forming a sealed cavity around an end of a fastener, the cap comprising: a cap body comprising a domed head portion and an annular base portion terminating at a first rim which surrounds an opening into a central cavity defined by the interior wall of the cap body; an annular skirt terminating in a second rim providing an annular pocket between the skirt and the base; and a contact adhesive layer provided on the interior wall of the cap body forming an attachment surface.

The domed head portion may comprise an inverted portion which carries the attachment surface. The cap may comprise a pad fixed to the attachment surface. The pad may be formed of a resiliently deformable material. The cap may be provided for an aircraft. The cap may be provided for an aircraft fastener located on aircraft structural member formed of a synthetic composite material. The cap may be configured for use inside an aircraft fuel tank.

Another embodiment of the present technology may provide a kit of parts for a cap for forming a sealed cavity around an end of a fastener, the kit comprising: a cap body comprising a domed head portion and an annular base portion terminating at a first rim which surrounds an opening into a central cavity defined by the interior wall of the cap body; an annular skirt terminating in a second rim providing an annular pocket between the skirt and the base; and portion of the interior wall of the cap body forming an attachment surface; and one or more portions of contact adhesive configured for fixing on the fixing surface for fixing the cap to a substrate.

Another embodiment of the present technology provides a cap for forming a sealed cavity around an end of a fastener substantially as disclosed herein with respect to the figures. A further embodiment of the present technology provides method of fitting a cap around an end of a fastener for forming a sealed cavity around the end of the fastener substantially as disclosed herein with respect to the figures.

BRIEF DESCRIPTION OF THE DRAWINGS

Embodiments of the technology will now be described, by way of example only, with reference to the following drawings in which.

DETAILED DESCRIPTION OF EMBODIMENTS OF THE TECHNOLOGY

Figure 1:
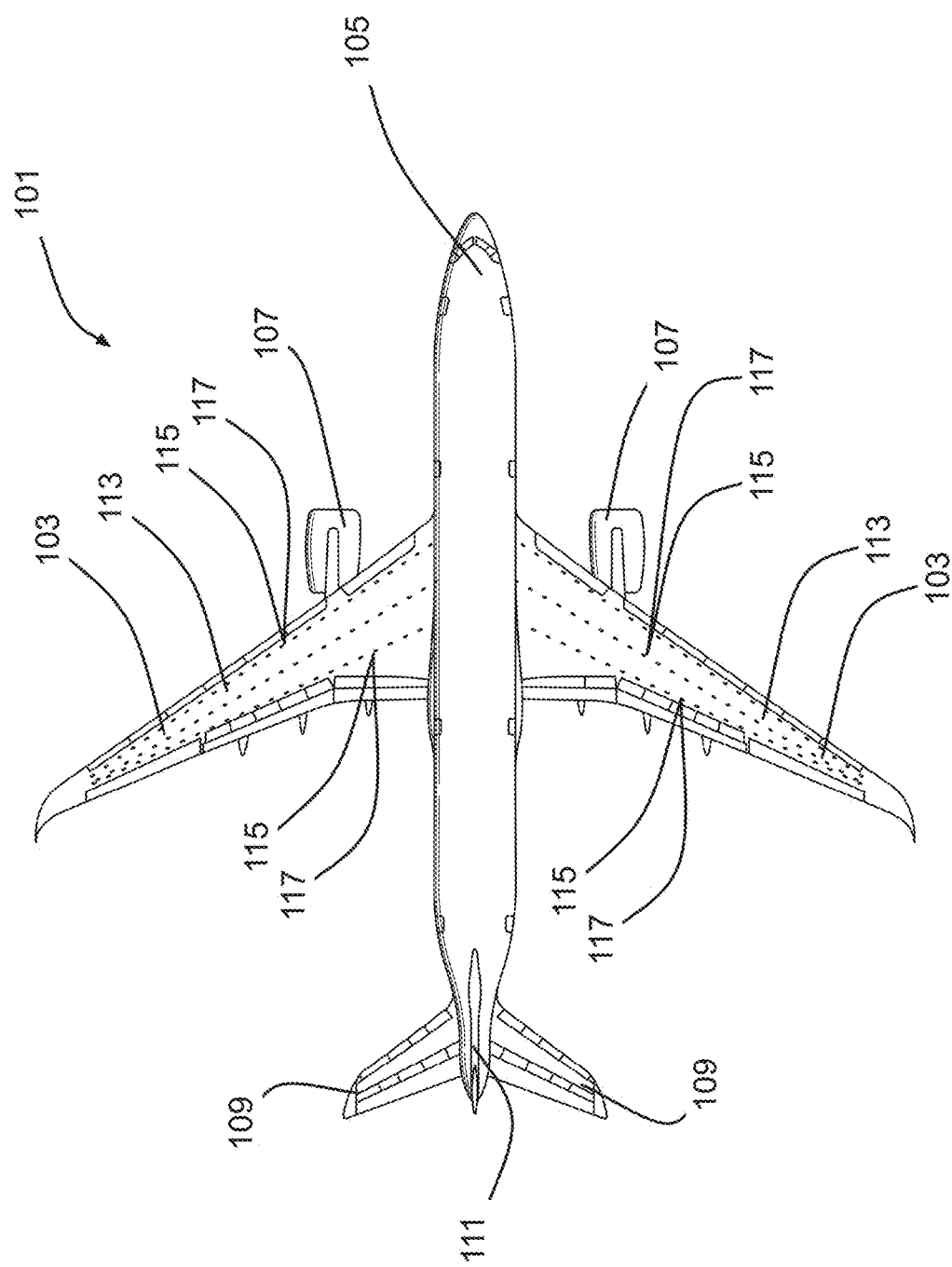
FIG. 1 is a plan view of an aircraft partially formed from a synthetic composite material in the form of carbon fibre reinforced plastic (CFRP) and comprising caps covering the ends of fasteners.

With reference to FIG. 1, an aircraft 101 comprises a pair of wings 103 faired into a fuselage 105. The wings 103 each carry an engine 107. The aircraft 101 further comprises horizontal stabilizers 109 and a vertical tail plane 111 each attached at the rear of the fuselage 105. The aircraft 101 comprises structural elements that are formed from a carbon fibre reinforced plastic material (CFRP). For example, the wings 103 each comprise structural members 113, such as spars and wing covers, formed at least in part from CFRP. The structural members 113 are fixed to each other using fasteners 115. The portion of each of the fasteners 115 that protrudes from the relevant structural member 113 into an interior space of the aircraft 101, such as the interior space of the wing 103 that comprises a fuel tank, are covered by a cap 117. Each cap 117 is configured, in its installed state, to form a sealed cavity around the portion of the associated fasteners 115 that protrudes from the relevant structural member 113 as described in further detail herein.

Figure 2:
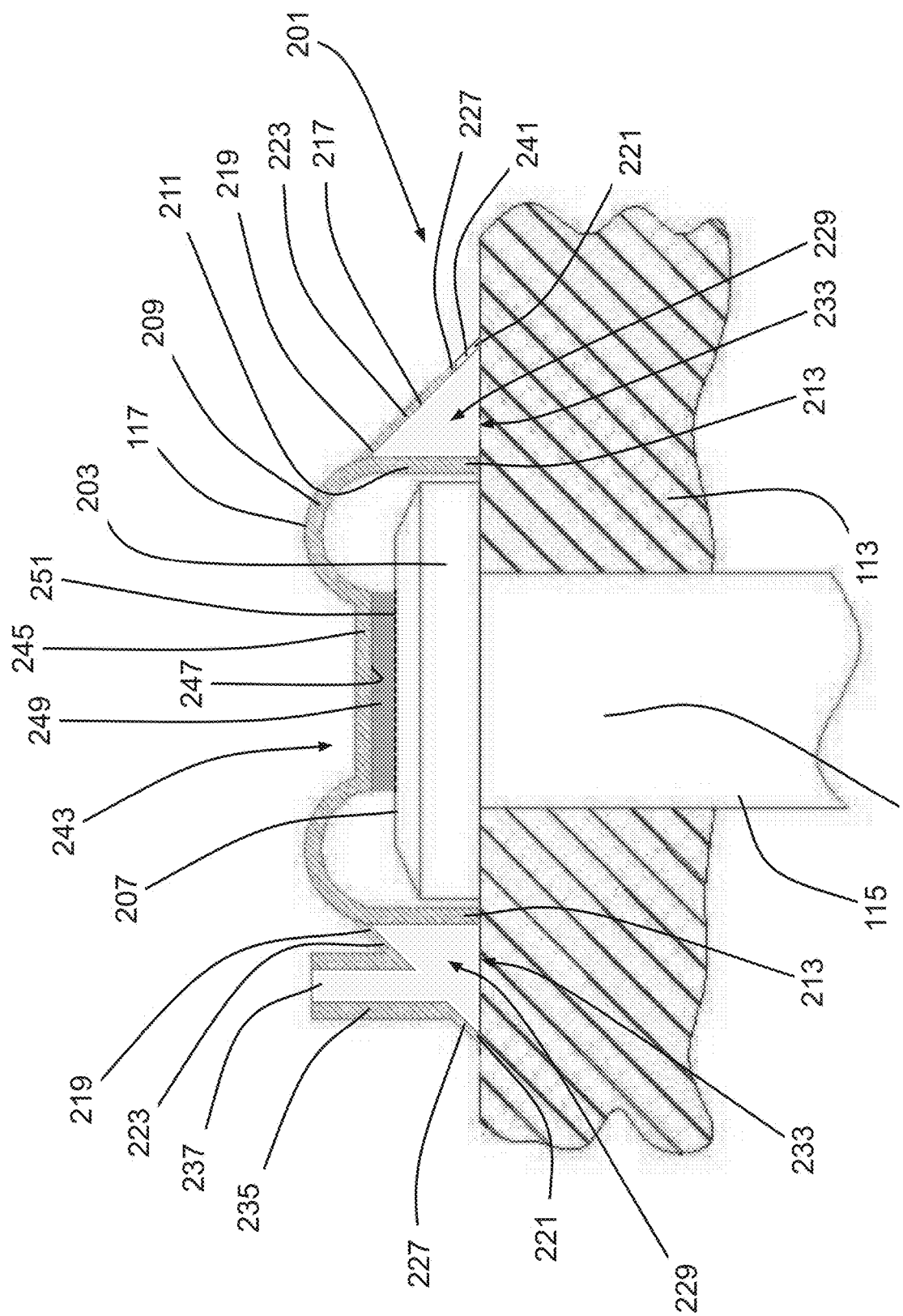
FIG. 2 is a cross-sectional view of a cap in a partially installed state, in accordance with an embodiment of the present technology.

With reference to FIG. 2, a joint 201 comprises a structural member 113 such as an aircraft skin panel (not shown) fastened to another structural member 113 such as a spar. A head 203 of a fastener 115 protrudes from the joint 201. The fastener 115 further comprises an axially extending shaft 205 integral with the head 203, which passes through the structural members 113. The head 203 has a substantially planar upper surface 207. The cap 117 encloses the head 203 of the fastener 115. The cap 117 has a cap body with a domed upper part or head portion 209 and a cylindrical or annular base portion 211 terminating at a rim 213, which surrounds an opening into a central cavity 215. In other words, the interior surface of the cap 117 defines the central cavity 215. The rim 213 lies in a plane so it can intimately engage with the planar surface of the structural member 113 around its full circumference when the cap 117 is fitted over the head 203 of the fastener 115 as shown.

An annular skirt 217 extends from an upper end 219 where it meets the cap body to a lower skirt rim 221, which lies in substantially the same plane as the rim 213 of the annular base. The skirt rim 221 is configured to lie against the planar surface of the structural member 113 around the substantially the whole of the circumference of the skirt rim 221. The skirt 217 is flared from its upper part 223, which extends away from the body at an acute angle to a cap axis 225, to a lower part 227, which further extends parallel away from the cap axis 225. An annular pocket 229 is provided between the skirt 217 and the base 211. The pocket 229 extends from a closed lower end 231 at the upper end 223 of the skirt 217, to an open lower end 233 at the skirt rim 221. Due to the flared shape of the skirt 217, the pocket 229 has a radial width, which increases as it extends from its upper end 223 to its lower end 233.

The skirt 217 has a tubular projection 235 which projects outwardly from the skirt 217 and provides an injection channel in the form of a circular inlet hole 237. The tubular projection 235 is arranged to interconnect with a nozzle of a sealing material injection device (not shown) for injecting a sealing material through the skirt 217 via the inlet hole 237 into the pocket 229. The skirt 217 also has a circular outlet hole 241 in the edge of the skirt rim on an opposite side of the cap axis 225 to the inlet hole 237. The outlet hole 241 is in fluid communication with the pocket 229.

The central portion of the domed upper part 209 of the cap 117, referred to herein as the cap centre 245, is inverted so that the domed upper part 209 comprises semi-toroidal dome structure. In other words, the central portion or peak of the domed upper part 209 is inverted inwardly towards the lower end of the cap 117. The cap centre 245 comprises a generally downward facing internal fixing surface 247 configured to carry a pad 249. In the present embodiment, the pad 249 is disc shaped and substantially conforms to the fixing surface 247. The pad 249 is formed from a resiliently deformable material and is bonded to the fixing surface 247. The lower face of the pad 249 carries a layer of very high bond (VHB) contact adhesive 251, which in the uninstalled state of the cap 117 is covered by a peelable protective layer (not shown). Prior to the initial installation of the cap 117 as shown in FIG. 2, the peelable protective layer is removed so that the contact adhesive 251 of the pad 249 provides and attachment surface for fixing the cap 117 to the upper surface 207 of the head 203 so as to enclose the protruding head 203 of the fastener 115. The resiliently deformable nature of the pad 249 is configured to promote both initial and continued adhesion of the contact adhesive 251 to the fastener head 203. The cap 117 and pad 249 are dimensioned so that when the cap 117 is fixed to the fastener head 203 as described above, the rim 213 and the skirt rim 221 are biased into contact with the surface of the structural member 113.

Figure 3:
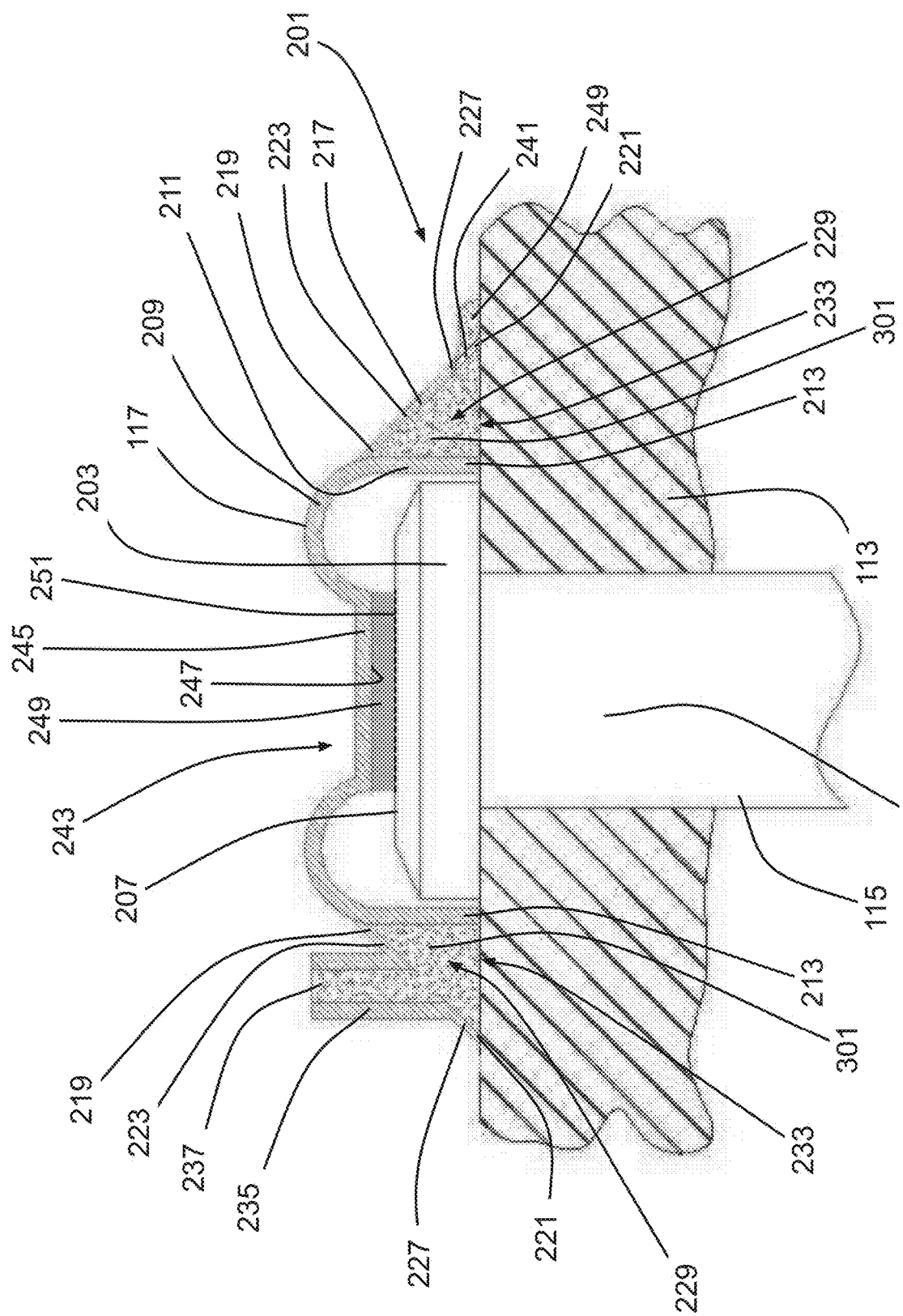
FIG. 3 is a cross-sectional view of the cap of FIG. 2 in a fully installed state.

With reference to FIG. 3, when a sealant or sealing material 301 is injected into the inlet hole 237, the sealing material 301 flows through the skirt 217 and into the pocket 229. The injected sealing material 301 displaces air in the pocket 229 via the outlet hole 301. When the pocket 229 is full, then the pressure in the pocket 229 increases until it forces sealing material 301 to escape the pocket 229 through the skirt 217 via the outlet hole 241. When this flow of sealing material 301 out of the outlet hole 241 is visually observed, the flow of sealing material 301 from the sealing material injection device is stopped.

Once injected, the sealing material 301 is allowed to cure, leaving a cured sealing material 301 in the pocket as shown in FIG. 3. The cured sealing material 301 bonds the cap 117 to the structural member 113 and forms a seal around the cavity 215. This seal prevents the ingress of water or other contaminants into the cavity 215, and also prevents plasma or other out-gassing products from exiting the cavity 215 in the event of a lightning strike. The cured sealant 301 has a small stub 243 protruding from the outlet hole 241. Cured sealing material 301 also fills the injection channel and the inlet hole 237.

Another embodiment of the present technology will now be described with reference to FIG. 4 in which for clarity the same reference numbers are used to indicate those parts of the embodiment that are common or equivalent to those of the previous embodiment.

Figure 4:
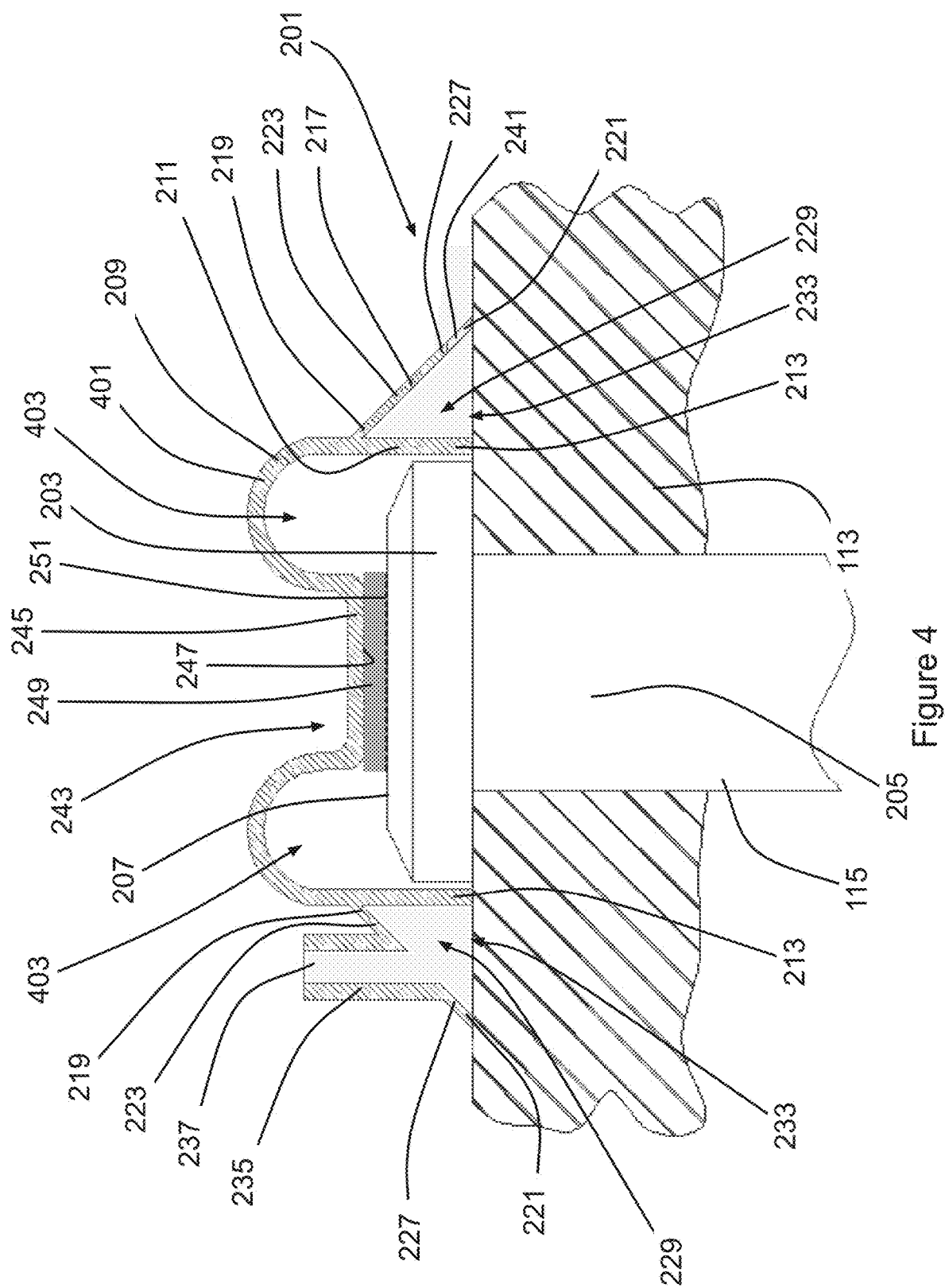
FIG. 4 is a cross-sectional view of a cap in a partially installed state, in accordance with another embodiment of the present technology.

With reference to FIG. 4, a cap 401 is a modified version of the cap 117 of FIG. 2 in which the volume of the sealed cavity 403 formed by the cap 401 around the fastener head 203 is increased relative to the cap 117. In other words, the domed upper part 209 of the cap 117 is extended upwardly away from the fastener head 203. The increased volume of the cavity 403 is configured to contain higher volumes of outgassing from the fastener 115 in response to lightning strike of the aircraft structure. As will be understood by those skilled in the art, sets of caps 117, 403 configured with various encapsulating volumes may be provided for use on a single structural application to provide lightning strike protection tailored to individual fasteners or groups of fasteners. For example, a set of caps may be configured to fit the same height or diameter of fastener head but have different encapsulation volumes provided by corresponding heights of the respective domed upper parts.

Embodiments of the present technology enable a cap to be applied to a fastener independently of a special feature of the fastener. For example, some caps require the fastener to include specific attachment features for the cap to engage with such as a stepped washer or other mechanical engagement feature. Embodiments of the technology are not limited to use with a fastener head since any part of a fastener may naturally present a suitable surface for attaching the cap as described herein. Rivets, swaged fasteners, nuts, bolts, screws or rivets may all present suitable attachment surfaces for the cap technology described.

A suitable sealant material 301 is a polysulphide sealant such as Naftoseal® MC238B, MC238A, or MC780 available from Chemetall Group. All parts of the cap 117 are integrally formed by injection moulding or similar. A suitable material is a glass filled polyetherimide (PEI) resin such as Ultem 2400 or Ultem 2310, available from SABIC Innovative Plastics Holding BV.

As will be understood by those skilled in the art, cap may be configured for any suitable application and sized or shaped accordingly. The cap may be formed from any suitable material or combination of materials. The cap is not limited to use with CFRP but may be applied to any suitable surface made of any relevant material or combination of materials, for example, aluminium, steel or titanium. The contact adhesive may be applied to the fixing surface at any suitable point prior to the installation of the cap. The contact adhesive may be applied directly to the first fixing surface or via a double-sided tape, such as a very high bond tape (VHB), a sticker or a pad of any suitable thickness. The pad or tape may be formed of a resiliently deformable material of any suitable thickness for a given application.

As will be understood by those skilled in the art, while the embodiments described herein refer to a single part cap, other embodiments may comprise a multiple part cap. As will be understood by those skilled in the art, the In the description the terms "upper" or "lower" have been used to describe the relative location of features of the cap with respect to the substrate against which the cap is positioned or intended to be positioned. As will be understood by those skilled in the art, the substrate may be oriented in any given direction or plane but this is not intended to affect the interpretation of the terms "upper" or "lower" used herein.

The use of the term "or" in the present document is intended to mean "and/or" and should not be interpreted as "exclusive or" unless explicitly indicated otherwise.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A cap for forming a sealed cavity around an end of a fastener, the cap comprising:
    a cap body comprising a domed head portion and an annular base portion terminating at a first rim which surrounds an opening into a central cavity defined by the interior wall of the cap body;
    an annular skirt terminating in a second rim providing an annular pocket between the skirt and the base; and
    a contact adhesive layer provided on the interior wall of the cap body forming an attachment surface, and
    a pad fixed to the attachment surface.

2. The cap according to claim 1 in which the domed head portion comprises an inverted portion which carries the attachment surface.

3. The cap according to claim 1, in which the pad is formed of a resiliently deformable material.

4. The cap according to claim 1, wherein the cap is configured as an aircraft fastener.

5. The cap according to claim 4 in which the fastener is located on an aircraft structural member formed of a synthetic composite material.

6. The cap according to claim 1, wherein the cap is configured for use inside an aircraft fuel tank.

7. A kit of parts for a cap for forming a sealed cavity around an end of a fastener, the kit comprising:
    a cap body comprising a domed head portion and an annular base portion terminating at a first rim which surrounds an opening into a central cavity defined by the interior wall of the cap body; an annular skirt terminating in a second rim providing an annular pocket between the skirt and the base; and portion of the interior wall of the cap body forming an attachment surface;
    one or more portions of contact adhesive configured for fixing on the fixing surface for fixing the cap to a substrate, and
    one or more portions of sealing material configured to bond the cap to the substrate.

8. A cap body including:
    a cap body having a domed head configured to overlap of a cap affixed to an outer surface of an aircraft structural member, and an annular base extending from the domed head to the outer surface, wherein the domed cap and annular base form an enclosure configured to cover the cap;
    an annular skirt having an inner region joined to the annular base and extending outward to seat on the outer surface of the structural member;
    an annular pocket formed by the annular base, annular skirt and outer surface of the structural member, wherein the annular pocket extends around the annular base;
    a contact adhesive between the domed head and the cap, wherein the contact adhesive fixes the cap body to the cap, and
    a cured sealant in the annular pocket wherein the cured sealant forms an annular seal seated on the outer surface of the structural element and filling the annular pocket.

9. The cap body and fastener assembly of claim 8, further comprising a spout extending outward from the annular skirt, wherein the spout defines a sealant flow passage extending from an inlet opening, through the sealant flow passage and to the annular pocket, wherein the inlet opening and the sealant flow passage are configured to allow the curable sealant to flow through the spout and into the annular pocket.

* * * * *